(12) United States Patent
Cloonan et al.

(10) Patent No.: US 7,698,461 B2
(45) Date of Patent: *Apr. 13, 2010

(54) METHOD AND APPARATUS FOR QUEUING DATA FLOWS

(75) Inventors: Thomas J. Cloonan, Lisle, IL (US); Jeffrey J. Howe, West Chicago, IL (US); Kevin P. Urban, Downers Grove, IL (US)

(73) Assignee: ARRIS Group, Inc., Suwanee, GA (US)

( * ) Notice: Subject to any disclaimer, the term of this patent is extended or adjusted under 35 U.S.C. 154(b) by 295 days.

This patent is subject to a terminal disclaimer.

(21) Appl. No.: 11/839,115

(22) Filed: Aug. 15, 2007

(65) Prior Publication Data

US 2008/0040718 A1    Feb. 14, 2008

(51) Int. Cl.
G06F 13/00    (2006.01)

(52) U.S. Cl. .................. 709/238; 709/240; 370/395.42; 370/395.43; 370/235

(58) Field of Classification Search .................. 709/238, 709/240; 370/395.42, 395.43, 235
See application file for complete search history.

(56) References Cited

U.S. PATENT DOCUMENTS

| 6,996,061 | B2* | 2/2006 | Yang et al. ................... 370/233 |
| 7,154,902 | B1* | 12/2006 | Sikdar ......................... 370/412 |
| 7,272,144 | B2* | 9/2007 | Cloonan et al. ......... 370/395.42 |
| 7,277,425 | B1* | 10/2007 | Sikdar ......................... 370/366 |
| 2004/0001493 | A1* | 1/2004 | Cloonan et al. ......... 370/395.42 |

* cited by examiner

Primary Examiner—Kenneth R Coulter
(74) Attorney, Agent, or Firm—Troy A. Van Aacken; Robert J. Starr

(57) ABSTRACT

In a data system, such as a cable modem termination system, different-priority flows are scheduled to be routed to their logical destinations by factoring both the priority level and the time spent in queue. The time that each packet of each flow spends waiting for transmission is normalized such that the waiting times of all flows are equalized with respect to each other. A latency scaling parameter is calculated.

7 Claims, 6 Drawing Sheets

METHOD AND APPARATUS FOR QUEUING DATA FLOWS

CROSS REFERENCE TO RELATED APPLICATION

This application claims priority under 35 U.S.C. 120 to U.S. Pat. No. 7,272,144 entitled "Method and apparatus for queuing data flows," which was filed Jun. 26, 2002, and is incorporated herein by reference in its entirety.

FIELD OF THE INVENTION

This invention relates to cable data systems. In particular, this invention relates to a cable modem termination system (CMTS) and a method for intelligently controlling data flow queues in a CMTS

BACKGROUND OF THE INVENTION

A cable television or "CATV" system is a television broadcasting system that uses coaxial cable or fiber optic cable to distribute a broadband signal containing many separate television program channels that are frequency-multiplexed onto the cable. By allocating the frequency spectrum of one or more television program channels for data transmission, CATV systems are also used to carry data to and from CATV subscribers.

Data on a cable television system is sent as packets that resemble well-known Ethernet packets. Each data packet can have up to several hundred data bytes preceded by several critical data bytes that comprise the frame's header. Among other things, the header includes a preamble, a frame type, a source address and a destination address. A cyclic redundancy check or CRC is appended to the end of the packet for error detection.

Subscribers' computers are coupled to the cable via a cable modem. Each cable modem is assigned an address by the head end when the modem is turned on. The modem's address effectively identifies the computer to which it is coupled and enables each subscriber to have individualized connections to the Internet.

Downstream data packets are those sent from the head end of the cable system to the subscribers. Upstream packets are those sent from the subscribers to the head end. Once a data packet is physically transmitted onto the cable, all of the computers that are coupled to the cable can "see" the packets. By using Ethernet-like data frames however, the cable modems of the system read only the downstream data packets that are addressed to it and ignore all other packets. When packets are sent upstream, the cable modem provides to the data packets, the address assigned to the cable modem. That address of the sending cable modem effectively identifies the subscriber from which the packets originated and in so doing, also provide an address to which responsive packets can be sent.

At the top or "head end" of a cable television system is a cable modem termination system or "CMTS," a function of which is to provide complementary functionality to the subscriber's cable modems so as to enable data connectivity to a wide-area network like the Internet. The CMTS performs a variety of critical functions in a cable data system, including among other things, cable modem address assignments and data packet address translation by which packets received by the CMTS from an Internet connection are addressed (directed) to the proper cable modem. A CMTS also functions as a switch by taking upstream packets from the cable modems and routing them toward their proper destinations.

A CMTS includes one or more ports through which data is received and sent. Different ports are typically coupled to different pathways such that different ports lead to different logical destination addresses. By way of example, data from a subscriber received at one port of the CMTS might need to be routed out a different port in order for the packets to be routed to their destination (as determined by the destination address in the packet's header). In so doing, a CMTS receives upstream data packets, either from subscribers or Internet servers, and routes said packets to the port on which the intended recipient, or server for that recipient, resides as dictated by the packet's destination address. (A description of CMTS functionality can be found on the web site of CableLabs®, which is a non-profit research and development consortium of cable television operators within North and South America.

Most cable data systems now have more data server subscribers than there are channels that are available to be allocated to carrying data and as a result, cable data system subscribers share the data capacity of the frequency spectrum allocated to carry data. As the number of subscribers on a cable data system increases, bandwidth available to each subscriber (i.e., the service level) decreases. Stated alternatively, on a cable data system, responsiveness decreases as the number of users increases.

Those of ordinary skill in the art of computer networks in general, and cable data systems in particular, are familiar with the concept of "quality of service." Quality of service is concept of guaranteeing a throughput or a data transfer level. It is anticipated that next-generation cable data systems will offer customers guaranteed bandwidths (data rates) to customers willing to pay for it. Customers who pay for data rate guarantees will have their data packets routed through the cable data system ahead of lower-paying customers. The concept of being able to guarantee (and to be able to truly provide) different service or priority levels allows cable service providers the opportunity to provide better Internet service, as measured by connection bandwidth, to needy customers while charging a premium rate. Tiered service is expected to increase revenue for cable service providers.

One way of providing service levels is to organize Internet traffic into data flows. Data packets sent from the head end of the cable data system to a particular cable data system subscriber can be considered to be as one "data flow." Similarly, the upstream packets from the same customer, or some other customer can be considered to be another "data flow." By knowing the source and destination addresses of data packets on a cable data system, the data flows that they represent can be allotted different service (i.e., priority) levels by reading from a class of service list that a particular subscriber is entitled to.

Part of the job of a CMTS is to route incoming packets to their destinations, as determined by their packet destination addresses. In a CMTS, this usually requires that packets received at one port need to be switched out of the CMTS on a different port that is connected to a different physical or logical pathway leading to different logical destinations. In order to provide different service levels, data packets are stored in priority queues, which are known to those of skill in the networking art to be multi-element lists, each element of which is assigned a priority value or level that determines when the element is to be removed from the queue The primary task behind any Ethernet frame-based scheduling algorithm is to examine the contents of the multiple queues that are aimed at a particular shared resource, e.g., a channel time-slot on the cable or a port of the CMTS, and then decide which queue should transmit the next Ethernet frame to that shared resource. A relative scheduling algorithm must make decisions regarding the relative treatment each of the queues based on the priority level associated with that particular queue. In general, any scheduling algorithm must make trade-offs between fairness, delay, and implementation complexity.

Many theoretical models for scheduling have been presented in the literature. The Generalized Processor Sharing ("GPS") algorithm (A. K. Parekh and R. G. Gallager, "A generalized processor sharing approach to flow control—the single node case," in IEEE INFOCOM '92, Vol. 2, pp. 915-924, May 1992.) is generally considered to be a fair scheduling algorithm, because it attempts to follow a fluid flow model that transmits (and mixes) output traffic from various active queues at rates proportional to their assigned weights. Unfortunately, the ideal GPS algorithm requires that the arriving packets be broken down into infinitely divisible parts, which is not practical in a data system using variable size packets like Ethernet frames and tends to complicate the algorithm's implementation.

One approach that attempts to approximate the GPS algorithm is the Weighted Fair Queuing ("WFQ") algorithm disclosed by A. Demers, S. Keshav, and S. Shenker, in "Analysis and simulation of a fair queuing algorithm," published in Internetworking: Research an Experience, Vol. 1, No. 1, pp. 3-26, 1990). A limitation of this implementation is maintaining desirable latency performance of low-latency traffic, such as Voice-over-Internet Protocol (VoIP) service, during periods of traffic bursts.

Another approach that attempts to provide fair service includes the CORR algorithm disclosed by D. Saha, S. Mukherjee, and S. Tripath, as "Carry-Over Round Robin: A simple cell scheduling mechanism for ATM networks" and Deficit Round Robin Queuing (M. Sheerdhar and G. Varghese, "Efficient fair queuing using deficit round robin"). However, these algorithms distort fairness when a particular queue is filled with very long packets while other queues are filled with very short packets. In such a situation, the queue with the long frames will steal more than its fair share of bandwidth on the shared resource.

A method and apparatus that monitors the latency of every packet passing through the system and uses that information to dynamically adjust (in real time) the performance of the scheduling algorithm would provide improved queuing of data flows in a cable modem termination system and quality of service level differentiation. Such a method would be an improvement over the prior art.

DETAILED DESCRIPTION OF THE PREFERRED EMBODIMENT

Figure 1:
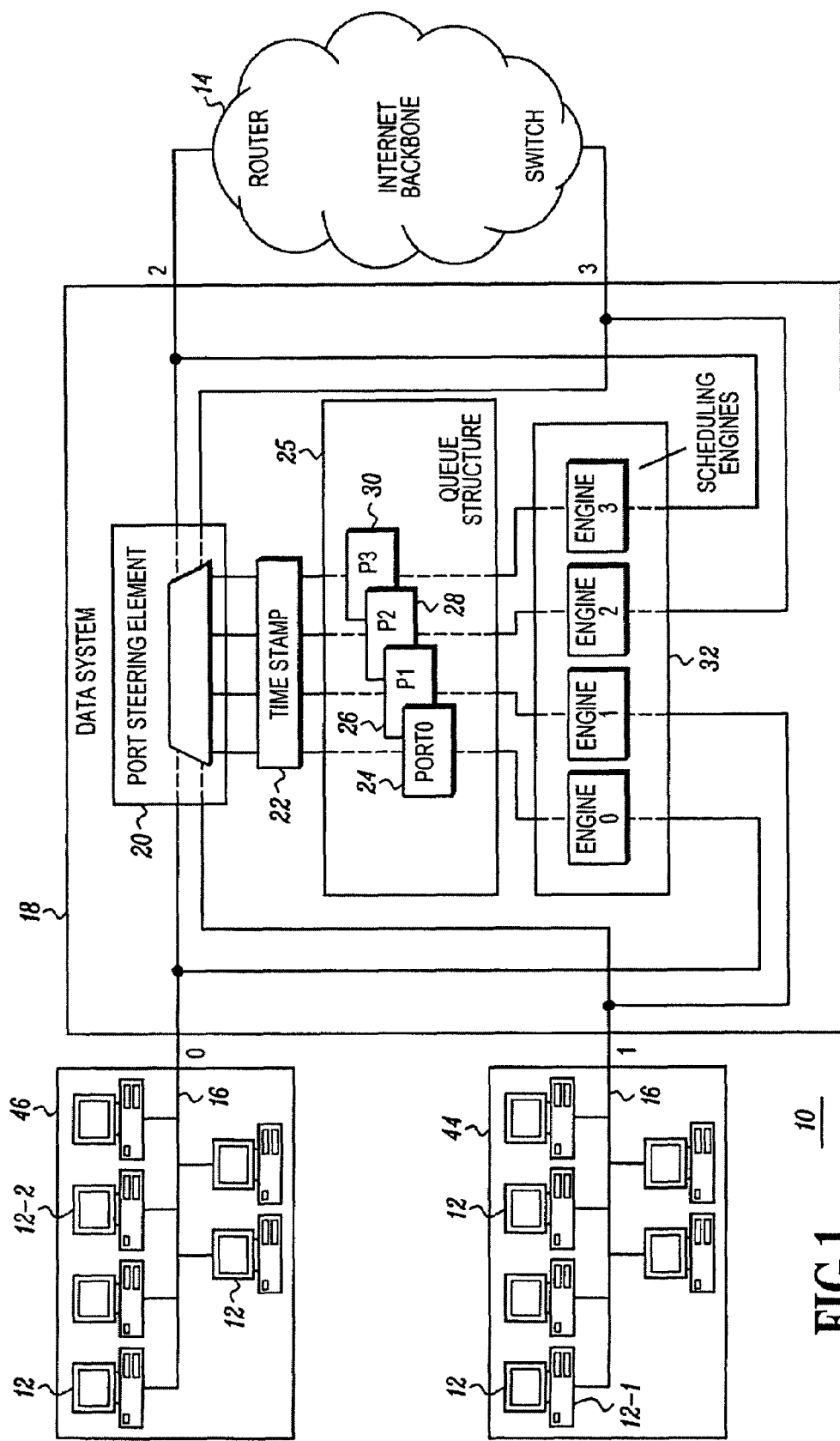
FIG. 1 shows a cable data system including a representation of a cable modem termination system employing the queuing method and apparatus disclosed herein.

FIG. 1 shows a block diagram of a cable data system 10 that provides data flow queuing according to the preferred embodiment. The several computers 12 of the subscribers to the cable data system 10 are operatively coupled to the coaxial cable 16 of a distribution network such as a CATV network (fiber optic cable in some embodiments) over which data packets are transmitted to and received from a data system 18. For illustration purposes, the computers 12 in FIG. 1 are sub-divided into two groups: Group 44 and Group 46. In a preferred embodiment, the data system 18 is a cable modem termination system or "CMTS." The coaxial cable 16 and the CMTS 18 form at least part of a data distribution network. Together, the cable 16 and the CMTS enable the computers 12 to communicate with each other as well as with other computers of the Internet.

The CMTS 18 shown in FIG. 1 has four ports (denominated 0-3) into which packets are sent and received. Ports 0 and 1 are each coupled to respective groups of computers 2. Computers of Group 46 are coupled to port 0; computers of Group 44 are coupled to port 1. Ports 2 and 3 are coupled to different servers that each provide access to the Internet backbone.

One function of the CMTS 18 is to route data packets to their destinations. Data packets can be sent into one port and routed out of another port. In so doing, the CMTS 18 acts as a switch, routing data packets to their logical destinations. Port 0 is coupled to the computers in Group 46. Port 1 is coupled to the computers in Group 44. Ports 1 and 2 are coupled to Internet backbone gateways. By way of example, data packets from group 46 computers (received at port 0) can be switched to output ports 0, 1, 2 or 3. The CMTS 18 therefore not only enables group A computers 46 to communicate with the set of all computers 12, but also to communicate with any other computer linked to the Internet backbone accessible via the internet backbone 14.

In order to provide truly differentiated service levels to different data flows, the CMTS 18 needs to intelligently treat packets in higher-priority data flows with a greater level of precedence than packets in lower-priority data flows. This can result in higher-priority data flows getting preferential treatment in many different ways, ranging from offering them more bandwidth on a shared resource to offering them more rapid transport (lower delay and lower latency) when passing through the CMTS.

Some portions of the CMTS system design (such as the congestion control algorithms that run on each of the input ports) are entirely dedicated to the control of bandwidth associated with each of the data flows. In most commercially-available CMTS systems, the scheduling algorithms that determine the order by which packets are transmitted out of the system are also dedicated to the control of bandwidth associated with each of the data flows.

However, a novel scheduling algorithm that determines the order by which packets will be transmitted out of the CMTS can be used to control both the bandwidth and the delay associated with each data flow. In order to do so, high-priority packets can be written to a high priority queue, while low priority packets can be written to a low priority queue. The service level agreement parameters can be used to define the priority of a packet. The association between a service level agreement and a particular data flow is established when a subscriber's data flow is registered within the CMTS 18. This registering of the subscriber's service level agreement usually occurs when the subscriber's cable modem is first powered up and makes contact with the CMTS 18. When a packet passes through CMTS 18, a classification of the packet into a particular data flow must be performed. Since each data flow is associated with a subscriber who registered for a particular service level, each data flow is then associated with a unique priority. A table look-up (usually into a memory) using the unique priority as a key produces the service level agreement parameters that are associated with the priority. By association, these service level agreement parameters are also associated with the data flow and packet. Examples of service level agreement parameters that can be attached to a priority level include the minimum guaranteed throughput (packets per second), the maximum permitted throughput (packets per second), the probability that general service will be available to the customer, and the probability that a packet from a data flow will be dropped during periods of congestion.

In advanced CMTSs, one may also want to specify desired latency characteristics within the priority-based service level agreement, where latency is defined as the interval of time required for the packet to pass between two specified points within its overall path. In many cases, the two specified points are defined to be an input port on the CMTS and an output port on the CMTS, although other points could be specified. The actual latency value experienced by any packet passing through the CMTS can be easily calculated by having a counter or free-running clock that specifies time relative to an arbitrary reference time. If the counter or clock is continually incremented as time passes, then a sample of the value in the counter or clock when a packet passes the first point can be designated as the packet's arrival time. A sample of the value in the counter or clock when the packet passes the second point can be designated as the packet's departure time. Subtracting the arrival time from the departure time yields the actual latency value for the packet. In some implementations, there may be a reason to calculate the current latency value of a packet stored in a queue of the CMTS. The current latency value is the actual latency value that the packet would experience if it were immediately selected by the scheduling algorithm to be sent to its destination (whether it is actually selected or not). The current latency value provides an approximate measure describing how long the packet has been stored in the queue of the CMTS (since delays in other parts of the CMTS system are usually negligible). A data packet that has been stored in the queue longer than any other data packet in the queue is said to be the oldest data packet in the queue.

Examples of desired latency characteristics include the minimum desired latency and the maximum desired latency. Specification of a minimum desired latency and a maximum desired latency yields a desired range for the actual latency for a packet. In general, the scheduling algorithm in a CMTS should attempt to transmit packets to their destination so that the actual latency experienced by the packet is greater than or equal to the minimum desired latency and less than or equal to the maximum desired latency. In truly differentiated service, guaranteeing a minimum desired latency implies that the packets of some flows should be made to wait a minimum time before being routed. This may be desirable if it gives customers the incentive to pay for higher-priority service levels. Packets that have waited a minimum time so that their current latency value is greater than or equal to the minimum desired latency are said to be eligible for scheduling, and they are called eligible packets. Packets that have not yet waited a minimum time (so that their current latency value is less than the minimum desired latency) are said to ineligible for scheduling.

In order to provide differentiated service levels, data packets of data flows entitled to a high priority should typically be routed through the CMTS 18 ahead of data packets of data flows that are entitled to low priority. Priority levels are usually assigned by a service provider according to the service level that a particular customer wants (or pays for), according to the type of service level that the carried-information requires. Packets of information that carry voice (i.e., telephone) over the Internet (VoIP) need to be routed quickly (at a high-priority level) so as to preserve the integrity of a conversation. Data packets representing an e-mail message can usually be sent at a lower-priority level. The type of information being routed through the data system or CMTS will frequently determine the priority level accorded to a data flow. Different data flows to or from the same address can also require different priority levels. An Internet service subscriber might want a very high service level for voice over IP, a slightly lower service level for browsing the web and an even lower service level for e-mail. The voice traffic, web browser and e-mail can each be considered a separate data flow, each of which can have a different service level.

Data packets of flows are stored or queued a finite amount of time in the course of being switched or routed. Inasmuch as all flows are queued to greater or lesser extent based upon their service level entitlements, the CMTS 18 uses a scheduling priority and packet latency in order to determine which flow should have its queued data packets routed to the packet's next destination. A packet's destination is determined by its destination address. A packet is effectively "delivered" to a destination by routing (switching) it to a CMTS 18 port that will carry the packet toward the packet's destination address. A "scheduling priority" is a scheme whereby higher priority packets are routed ahead of lower-priority packets as determined by the class of service that a customer is entitled to.

As is well-known, a packet or a flow "priority" has no meaning per se. A "priority" accorded to one packet or stream, is meaningful only with respect to a different priority accorded to a different packet or stream. The priority of a packet, data stream or a data queue is only meaningful when it is expressed relative to the priority of other packet packets, data streams or queues with different priorities. The term "relative scheduling priority" therefore only means that the priority accorded to a packet of a particular stream is determined relative to the priority accorded to packets of other streams. A "relative scheduling priority" therefore only means that one scheduling priority can be higher, lower or the same as another scheduling priority.

With the foregoing concept of "relative scheduling priority" in mind, each packet can be assigned a relative scheduling priority such that some packets should normally be routed to their destinations ahead of others. The specification of when a packet of a particular relative scheduling priority should be routed to its destination can be established by specifying or assigning one or more of the aforementioned desired latency characteristics to each relative scheduling priority to be accorded the packets of different streams. In other words, each packet can be assigned a minimum wait time, a maximum wait time, both a minimum and a maximum wait time, depending on the relative priority (i.e., the relative scheduling priority) to be accorded a packet.

The priority level of a packet can be determined by looking up the packet's source or destination address and linking the packet's source address or the destination address or both, to the service level(s) that the source or destination is (are) entitled to. The priority of a packet can also be determined by looking at other fields in the packet header, and using the values in those fields to look up the associated priority level of the packet. This priority level can then be appended as a data value to each frame of a flow. In the preferred embodiment, the priority level is determined by reading the source field for upstream packets (or destination field, in the case of downstream packets) and from the identity of the source (destination), looking up the service level that the source (destination)

is entitled to. CMTS 18 receives all such data flows and stores the packets to priority specific queues.

The process of queuing data packets entails writing data packets into a data storage device, such as a semi-conductor random access memory, and reading the packets from the memory at a later time, albeit in the order in which the packets were stored. Priority queuing is different: packets are read from the queue in an order that follows the priority assigned to the queued elements. In the CMTS 18, priority queuing of multiple flows is accomplished by storing high-priority packets in a high-priority queue; low priority packets are stored in a low-priority queue. Packets are read from the queues (low priority and high priority) after taking into account both the latency and priority of packets currently stored in each queue.

Data packets from a subscriber such as computer 12-1 are received at the CMTS 18 through its port 1 and are from there, coupled to the port steering element 20 so as to route the data packets to their respective destinations. The destinations are determined by the destination address in each packet. A packet's destination address can be an Internet protocol ("IP") address, among others.

The port steering element 20 in the preferred embodiment steers Ethernet packets according to one of two established protocols. Both protocols use unique destination identifier fields residing within the header of each Ethernet Packet. Those of skill in the art of data networks know both protocols. The first protocol is used in a "switch" based network and relies on the Destination Media Access Control (DMAC) address for destination determination. The second protocol is used in a "route" based network and relies on the Destination Internet Protocol (DIP) address for destination determination. In both instances, the steering element indexes a lookup table, usually composed of data stored in a random access memory element, with the DMAC or DIP address, or some derivatives thereof. The result of this lookup operation describes where the packet is to be sent.

The port steering element 20 switches or routes incoming data packet's received at each port 0-3 to at least one set of queues 24, 26, 28, 30 for each port 0-3. For each port, there is a separate queue to store the data packets for each service level. By way of example, if the CMTS 18 has four ports and supports two service levels per port, each port 0-3 would have two separate queues. The entire CMTS would therefore support a total of eight queues or queue equivalents.

The queues for each port store data packets corresponding to a service level or set of service levels that are to be routed to the corresponding port. For purposes of illustration, the CMTS 18 in FIG. 1 has four (4) ports, each of which have a queue into which high priority service level packets are written and a queue into which low priority service level packets are written. Accordingly, CMTS 18 provides two different service levels.

The port steering element 20 examines a destination address in the packet header, determines the service level accorded to the data packet, then routes each data packet through a time-stamp circuit 22 and on to the appropriate queue for each output port. The time-stamp circuit 22 appends a scalar to each packet (also known as a frame) that identifies when the packet arrived at the CMTS 18.

Those skilled in the art will recognize that a finite amount of time will elapse between the time that a packet arrives at the CMTS 18 and when a packet header is edited due to latency associated with the port steering element 20. It should be apparent that the time-stamp circuit 22 could be placed in several other meaningful locations within the CMTS 18, including at the actual input port or above the port steering element. If transit delays through the circuitry of the CMTS 18 are minimal, the differences in time-stamps created by the time-stamp circuit 22 when placed at these different locations should be negligible. Even if these transit delays are significant, they will oftentimes be essentially fixed delay values, so the CMTS 18 can account for the delay associated with said steering element (and other circuitry) by reducing the service level latency characteristics by the value of said steering element latency (and other circuitry latency). In the preferred embodiment, the time stamp circuit 22 is a timer that assigns a multi-byte integer representing the current time.

After the time of arrival value is appended to each data packet, the data packet is stored to its corresponding priority queue of its destination port. The scheduling algorithm presented herein determines the packet's current latency by subtracting the scalar representing the time of arrival from the current time (which is obtained from the time-stamp circuit's timer or from another timer which is roughly synchronized to the time-stamp circuit's timer). The resulting packet latency (also a scalar) is then reduced by the minimum latency requirement of its associated service level, $T_{MIN}$, and then normalized. This result is used to determine the next packet to send from the CMTS. In other words, packet delivery scheduling uses a latency characteristic assigned to a packet's scheduling priority.

As shown in FIG. 1, the queues for the ports are part of a queue structure 25.

In general, "queues" are collections of information, the contents of which are organized according to rules. One queue organization rule uses the order of information entry. Two queues organized by such a rule are commonly known as First-In-First-Out (FIFO) or Last-In-First-Out (LIFO) queues. Another queue organization rule is based upon priority ordering whereby the extraction of information, data, or other queue elements therefrom is determined according to an importance, value, significance or, in the case of data networks, service level assigned to or associated with each element in the "priority queue". Still other rules use priority ordering in conjunction with order of entry to determine the order of extraction. The factors, configurations, and techniques leading to queue ordering forms the science known as queuing theory.

In the preferred embodiment, the queue structure 25 is implemented using an array of semiconductor memory organized into N queues or data structures, where N is equal to the number of queues for the entire system. Each data structure of the N structures is associated with, or stores data packets for, a certain service level (i.e. priority level) and will contain a variable number of elements, the length of each of which is also variable. (The elements stored in the data structures/queues are Ethernet packets. The length of each element in the queue is variable because Ethernet packets are of variable length.) In the preferred embodiment, the data structures are organized as FIFO queues.

For example, CMTS 18, which provides two service levels and which has four ports, has the queue structure 25 organized into eight queues (or data structures). For each of the four ports 0-3, the data packets to be routed from each port are stored into a queue for each priority level. As a result, each port 0-3 has a first queue for the high priority level packets and a second queue for the low priority level packets, resulting in a total of eight queues. A delivery sequence of a high-priority upstream packet from the subscriber computer 12-1 (residing on port 1) to the subscriber computer 12-2 (residing on port 0) is as follows: a packet from computer 12-1 is received on port 1 of CMTS 18; the steering element 20 determines service level associated with said packet and forwards the packet to the high priority queue associated with port 0; the data packet then awaits scheduling for port 0 delivery according to a data packet extraction scheduling rule described below; upon receiving a packet delivery permission grant from the port 0 scheduling engine, the packet is transmitted through port 0 and decoded by the destination subscriber computer 12-2. Similarly, an upstream packet from subscriber 12-1 that is a low-priority packet and which is addressed to another computer somewhere on port 1 will be routed to the low priority queue for port 1.

Figure 2:
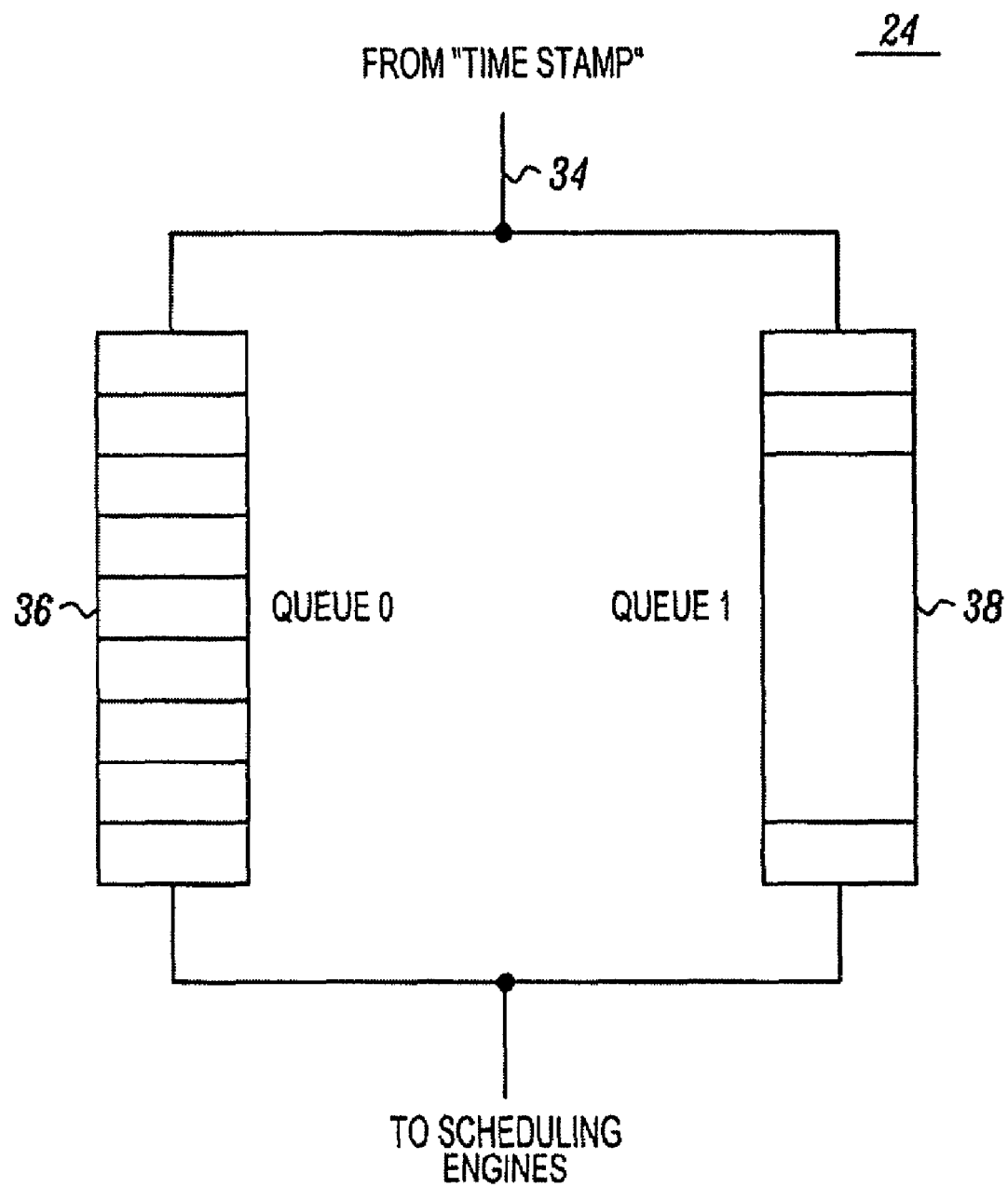
FIG. 2 shows a representation of two queues used to store data packets for each port in a CMTS that recognizes two different priority levels.

The arrangement of the queues for a port is conceptually depicted in FIG. 2. At input 34, the data packets to be routed to a particular output port can be stored into either queue 36 or 38 depending upon the service level assigned to the packet. For illustrative purposes, FIG. 2 shows only two queues: the first queue 36 stores low priority data packets; the second queue 38 stores high priority packets. Both queues 36 and 38 store packets for the same output port. Similarly, all other ports are provided with a queue for each service level.

Other embodiments of the invention would include providing more than two priority service levels or a mixture of priority service levels (and therefore includes a number of queues other than two queues at each port) as well as data systems (i.e., the CMTS) with more than or less than, four ports. Such alternate embodiments that employ the scheduling method disclosed herein would have for each port, a data packet queue for each service level that is not necessarily limited to a set value. For example, one port could provide two (2) different service level priorities while a second port could provide four (4) service level priorities while still other ports could be provide even a greater number of service level priorities.

Figure 3:
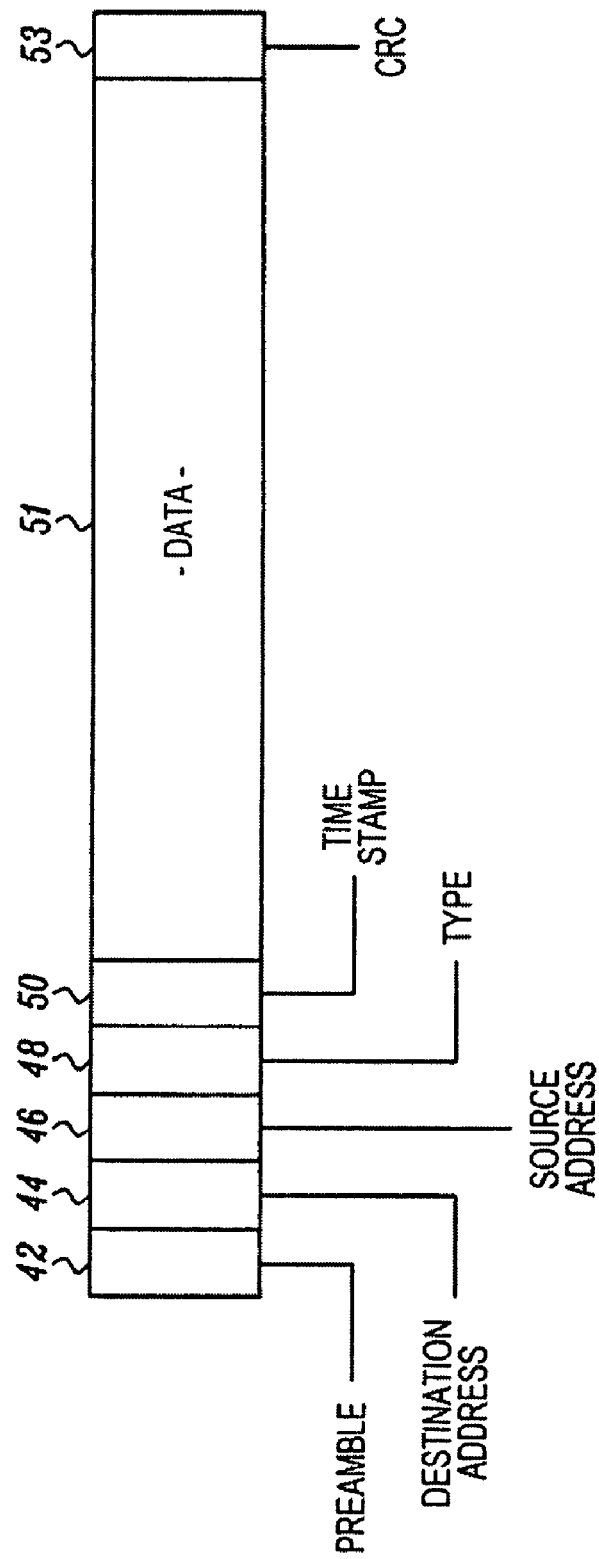
FIG. 3 shows an exemplary data packet.

FIG. 3 depicts a single Ethernet data packet (also known as a "frame") 40. (There are presently at least four different types of Ethernet frames, each defined by the structure of the frame, i.e., the number of bytes allocated to each field in the header, data filed and trailer fields.) Ethernet frames in general can have between 64 and 1518 bytes. The first several bytes (usually the first eighteen) comprise the header of an Ethernet packet. The next forty-six to fifteen hundred bytes are data.

For illustrative purposes, the packet header shown in FIG. 3 includes the preamble 42, destination address 44, source address 46, packet type 48 and time stamp 50. The data field 51 (which is the information to be carried to the packet's destination) of the packet 40 follows the header. A trailer field that is a cyclic redundancy check, or "CRC" 53, is used to detect errors in the packet 40 is the last field. In the preferred embodiment, the time stamp 50 is "appended" to the data packet 40 by being linked to the packet; the time stamp is not part of the header. The data packet's time of arrival is considered to be "assigned" to the data packet (or "associated" with a data packet) whether the data representing the time of arrival is actually within (or embedded in) the header of the packet or the time of arrival is linked to the header and stored separately. Each packet is accorded a scheduling priority. As described above, a packet's scheduling priority can be determined from a packet's source address, destination address, or other fields in the packet's header. Each packet is routed to its destination address by the CMTS 18 according to the (relative) priority that it is entitled to.

Figure 4:
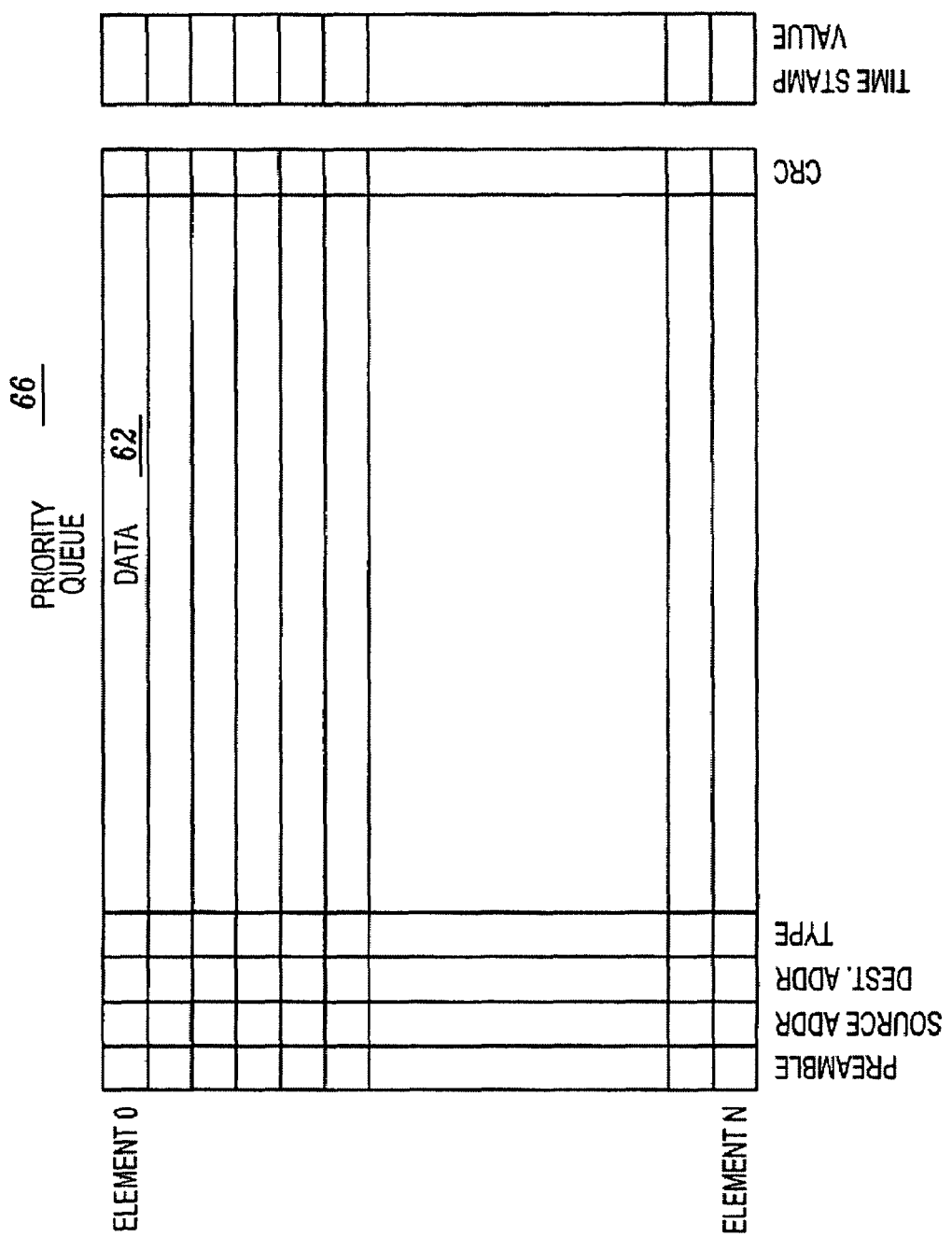
FIG. 4 shows an exemplary data structure.

FIG. 4 depicts a structure of a priority queue 66 of data packets 62. Data packets 62 can be written into the queues at different times or at the same time. Each of the multi-byte packets stored in the queue 66 has the same priority or service level, even though the packets might be from different flows and represent different types of information. By way of example, data packets of an e-mail message of one flow can be stored in the same queue (i.e., queued) with data packets of a different flow, which could be packets for a Voice-over-IP stream or packets for a stream to or from a web browser.

In FIG. 1, four scheduling engine processors/circuits, denominated 32-0, 32-1, 32-2 and 32-3, determine the order in which packets are read from the different queues for the different ports. Scheduling engine 32-0 determines the order for packets read from the set of queues 24 (which queues contain packets destined for output port 0), scheduling engine 32-1 determines the order for packets read from the set of queues 26 (which queues contain packets destined for output port 1), scheduling engine 32-2 determines the order for packets read from the set of queues 28 (which queues contain packets destined for output port 3), and scheduling engine 32-3 determines the order for packets read from the set of queues 30 (which queues contain packets destined for output port 2).

The scheduling engines 32 schedule the delivery of data packets. They read data packets out of each of the queues of the queue structure 25 according to a scheduling methodology by which the waiting time (hereafter referred to as "latency") of each data packet in each data queue is modified (shifted as described below) and then normalized or scaled. The resulting scaled latency of each data packet in a set of queues is compared to the other scaled latencies of other data packets within the same set of queues to identify the packet in that particular set of queues with the greatest scaled latency. The greatest scaled-latency packet of all packets within a set of queues is the next packet that will be transmitted to the output port associated with that set of queues. The result of this selection allows the packet with the greatest scaled latency to make its way through its associated output port toward its desired destination before all of the remaining packets that are still stored within the particular set of queues.

The process of normalizing or scaling the actual latency of data packets, which is described below, includes in the scaled latency calculation, both the length of time that a packet has been in queue and also the priority level that a packet is entitled to. A latency scaling factor is assigned to each queue. The assignment of a latency scaling factor to a queue defines the latency performance of that queue. Accordingly, small latency scaling factors typically lead to small scaled latencies while large latency scaling factors typically lead to large scaled latencies (although the actual scaled latency is also a function of the actual latency associated with the data packet). In the scheduling process, large scaled latencies are scheduled prior to small scaled latencies. Consequently, large latency scaling factors lead to short queue delays and a higher-priority service, whereas small scaling factors lead to long queue delays and a lower-priority service. As the method selects among scaled latencies, it is possible that low priority packets with a smaller scaling factor can be routed to their destination ahead of higher-priority data packets with a greater scaled latency factor if the actual latency associated with the low priority packet has become large relative to the actual latency associated with the high priority packet (implying that the low priority packet has been held in its queue for much longer period of time than the high priority packet).

Even though the data packets are preferably written into queues that are structured and operated as FIFO buffers, it should be understood that to deliver true quality of service, the CMTS 18 needs to be able to decide which of the many packets stored within a set of queues associated with a particular output port should be next routed to its destination. Typically, high priority data flows will be granted permission to transfer data packets ahead of low priority data flows. However, low priority data flows should be granted permission to transfer data packets ahead of even higher priority packets if a low priority packet has been in a queue longer than allowed by the customer's class of service or by the customer's service level agreement with the service provider. True quality of service can be realized if the waiting time of the data packets in each queue is normalized by factoring into the normalization, the priority level that each packet is entitled to receive, with the oldest packet in each data queue.

Figure 5A:
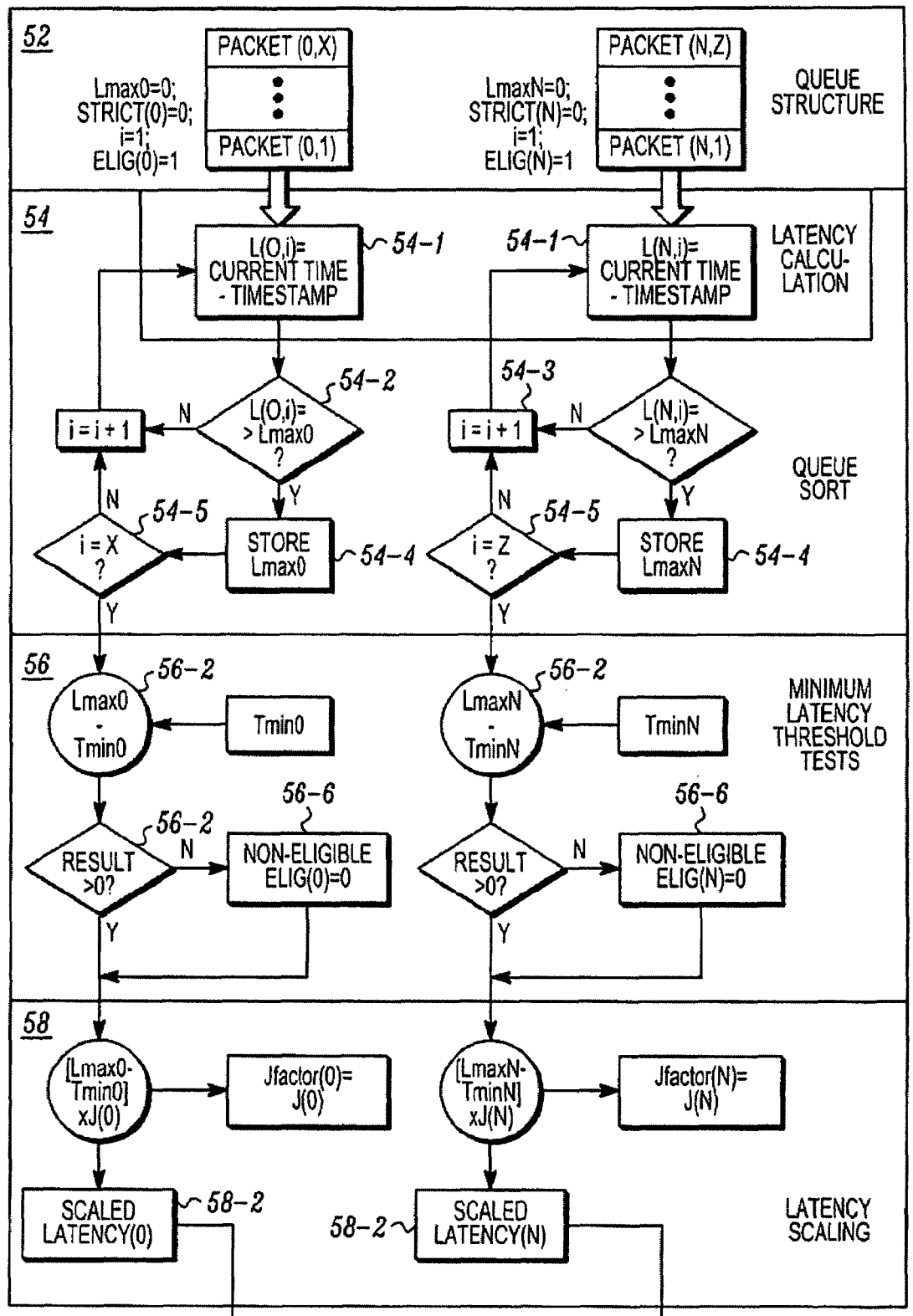
FIGS. 5A and 5B show the steps of a method to normalize data flows through several different queues.
Figure 5B:
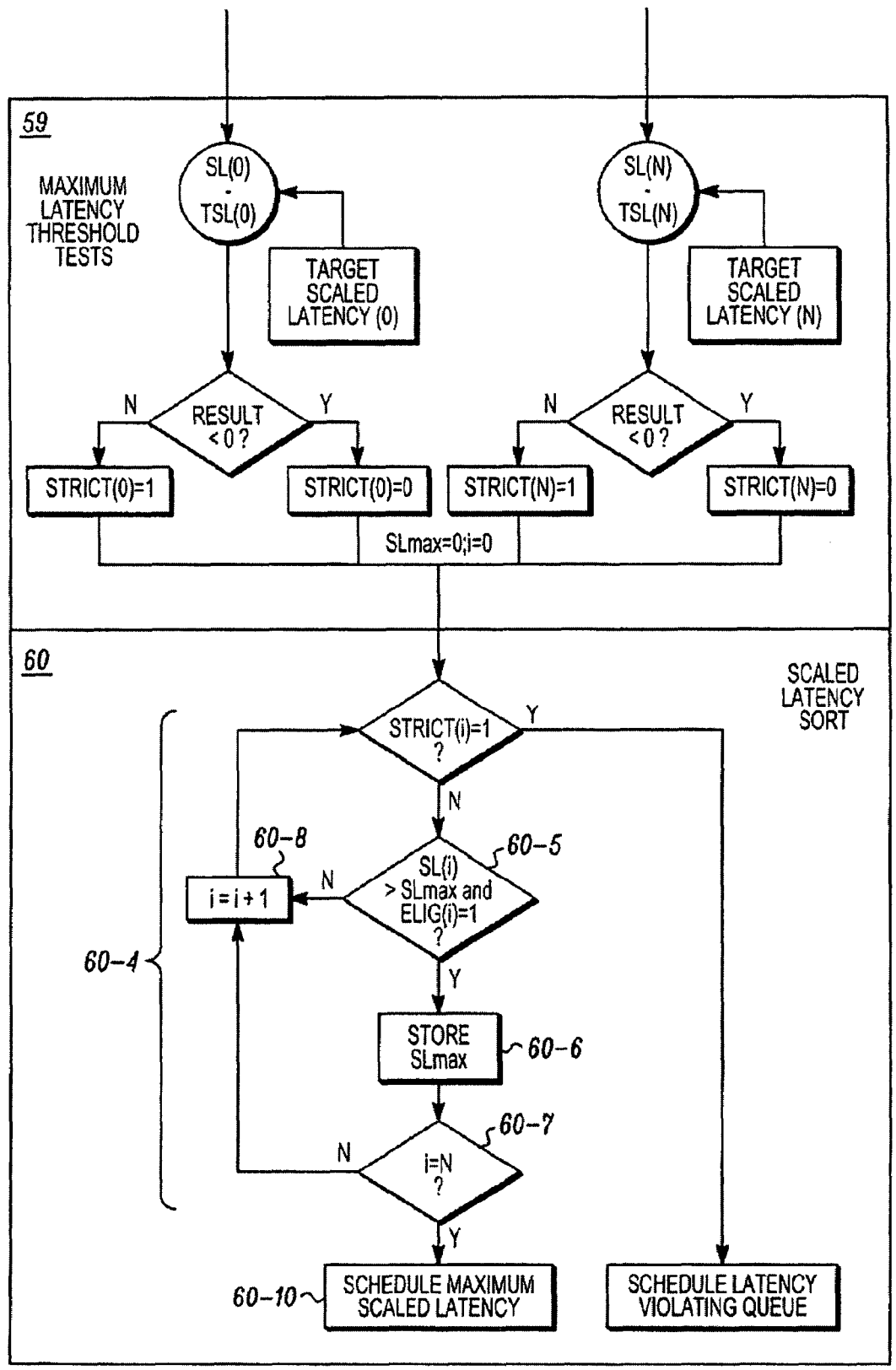

FIGS. 5A and 5B depict a flow-chart representation of the method for scheduling the delivery of data packets from a particular set of queues to a particular output port, using at least one latency characteristic and a packet's relative scheduling priority. A unique and separate instantiation of this scheduling algorithm could be implemented in each Scheduling Engine 32 for each of the output ports in the CMTS 18, or a single instantiation could be implemented in a common Scheduling Engine (not shown) and could be re-used with a unique time-slice and a unique set of state information being dedicated to each of the output ports in the CMTS 18. In a preferred embodiment, a unique and separate instantiation of this scheduling algorithm is implemented for each of the output ports 0-3.

Scheduling Method Overview

The scheduling method has different sets of related steps (denominated herein as "phases"), each of which includes one or more computational steps. In the first phase 52, shown in FIG. 5A, data packets received from the port steering element 20 are written into the appropriate data queues for the particular port. Port steering element 20 uses destination information (such as the DMAC address or the DIP address) and the packet's priority level information to direct the packets to their appropriate queues.

In the second phase 54, the current latency for each packet is calculated in step 54-1, and then the oldest packet in each queue is identified. In instances where a FIFO buffer is used for a priority queue, the oldest packet will reside at the "head" of the queue and the youngest packet will reside at the "tail" of the queue. Hence, FIFO implementations of a priority queue do not require phase 54 because all head packets are the oldest packets (with the greatest latency) within the buffer.

In the third phase 56, the oldest packet in each queue is tested against a minimum desired latency threshold specified for the relative priority level associated with all of the packets in that queue. This test determines whether the oldest packet in a queue is eligible for scheduling. An eligible packet is one that has a current latency greater than or equal to a minimum desired latency threshold value.

In the fourth phase 58, all eligible packet latencies are shifted by their minimum desired latency value defined for the relative priority associated with all of the packets in their respective queue. The shifting operation is accomplished by subtracting the current latency of each eligible packet by the minimum desired latency threshold. The result of each shifting operation is scaled according to the appropriate scaling factor (hereafter referred to as the "$J_{FACTOR}$"), which is associated with the relative priority for the packets in the queue. A test is then performed in phase 59 (shown in FIG. 5B) to determine if the scaled latency for the eligible packet is greater than a desired target scaled latency. Another embodiment performs this test by determining if the actual latency for the eligible packet is greater than the desired latency for this queue (the results are equivalent to the scaled version of the test). The results of this test are used in the fifth and final phase 60.

Assuming the test in phase 59 indicated that the scaled latency for at least one of the eligible packets was greater than its associated target scaled latency, then the eligible packet associated with one of the queues whose scaled latency exceeded the target latency will be selected and sent to the output port. A latency violating queue is considered to be any queue which contains at least one eligible packet whose scaled latency is greater than the target scaled latency for that queue. The particular one packet that will be selected next for transmission by the Scheduling Engine 32 will be associated with the latency violating queue whose relative priority is higher than all of the other latency violating queues (which is effectively a form of strict priority queuing between all of the latency violating queues). Assuming the test in phase 59 indicated that the scaled latency for all of the eligible packets was less than or equal to their associated target scaled latencies, then the eligible packet associated with the largest scaled latency will be selected and shipped to the output port.

Scheduling Method in Detail

Again with respect to FIG. 5, in the first set of steps that comprise phase 52, data packets are written into buffers, previously called data structures, according to the destination port and priority level assigned to each data packet. In FIG. 5, there are depicted N separate queues, 0 and N corresponding to N different service levels.

Phase 54 determines the maximum latency of all the packets in a queue of length "x" elements. At step 54-1, the time that a first data packet "i" spent in a queue is determined. A packet's current latency can be readily determined by calculating the current time (as provided by either the global clock or another real-time clock) minus the time stamp value attached to or associated with the packet as it passed through the time stamp 22. In the first execution of the loop of phase 54, "i" equals 1 and the comparison step 54-2 will store the packet latency associated with the first evaluated packet to $L_{MAX0}$ in step 54-4. At step 54-5, the value of the loop counter "i" is tested to see if the end of the queue has been reached. If there are more packets to evaluate, the loop counter is incremented at step 54-3 so as to point to the next packet.

As the loop counter "i" is incremented with each pass through the loop of phase 54, the latency of every packet is iteratively compared to the maximum latency of all previously tested packets. In the event that a new maximum latency is determined, said value is stored in a register or memory location called "$L_{MAX0}$" in step 54-4. When the latency value associated with the last packet in the queue has been evaluated, as determined by steps 54-5 and 54-3, the value stored at $L_{MAX0}$ will be the maximum latency value for packets within the queue. The maximum latency value $L_{MAX0}$ is then used in phase 56.

In phase 56, the scheduling engines 32 of each queue determine if the oldest packet in the queue, which is $L_{MAX0}$, is eligible for transfer to its appropriate output port. As set forth above, packet eligibility is determined by whether the packet's latency is greater than or equal to a desired minimum latency, which in some embodiments can also be zero. In true quality-of-service, priority flows can be made to wait a minimum amount of time, even if there is no other data traffic waiting to be routed. This can be accomplished by holding the packets for a service level in a queue until the resulting delay exceeds the minimum desired latency ($T_{MIN0}$) associated with their priority. $T_{MIN0}$ at step 56-2 is a minimum amount of time that a packet needs to wait in a particular queue for a particular service level. $T_{MIN0}$ at step 56-2 can be zero or greater than zero.

A test is made at step 56-2 whether the oldest packet in a queue has been waiting at least as long as $T_{MIN0}$. If the current latency (i.e., the wait time) of $L_{MAX0}$ is greater that $T_{MIN0}$, then the difference between these two values will be positive, and a determination is made at step 56-2 and 56-6 that the $L_{MAX0}$ data packet is eligible for transfer to its destination. This difference ($L_{MAX0}-T_{MIN0}$) is called the shifting operation, and the result is called the shifted latency value. The shifted latency value is forwarded to the scaling phase 58 for each of the eligible packets. The shifting operation ($L_{MAX0}-T_{MIN0}$) is an example of a "second function of said packet's latency", where the actual (unshifted) latency of the oldest packet is specified as $L_{MAX0}$. In the steps of phase 58, each of the shifted latency values (i.e. $L_{MAXi}-T_{MINi}$) in each data queue i is multiplied by a latency-scaling factor identified herein as a "$J_{FACTOR}$". This $J_{FACTOR}$ is related to at least one queue latency characteristic associated with a particular queue.

The $J_{FACTOR}(i)$ (which is associated with queue i) is also used to normalize the desired latency characteristics to create a value that is hereafter referred to as the "TARGET_SCALED_LATENCY", or simply "TSL"). Queues with a larger $J_{FACTOR}$ approach the TSL more quickly than queues with a smaller $J_{FACTOR}$. Packets that exceed TSL have waited in their queue longer than their time allotted by $T_{MAX}$, whereas queues that fall below TSL are below their allotted $T_{MAX}$. The scaled result of different queues can therefore be quantitatively compared to determine the packet that is most deserving to be scheduled based upon the queue's latency characteristics, $T_{MIN}(i)$ and $T_{MAX}(i)$.

The calculation of $J_{FACTOR}'(i)$ is a function of the inverse of the difference between $T_{MAX}(i)$ and $T_{MAX}(i)$. The difference operation ($T_{MAX}(i)-T_{MIN}(i)$) is an example of a "third function of the at least one desired latency characteristic", where this particular third function actually includes two desired latency characteristics: $T_{MAX}(i)$ and $T_{MIN}(i)$.

Hence, $J_{FACTOR}'(i)$ for each queue will be:

$$J'_{FACTOR}(i) = \frac{1}{T_{MAX}(i) - T_{MIN}(i)}$$

The evaluation or this function involves the computation of complex floating-point arithmetic. On it's face, $J_{FACTOR}'(i)$ is a fractional quantity. Second, the time stamp element 22 is not necessarily continuous and can increment once every time period (hereafter referred to as "T_TICK"). These considerations suggest that the calculation of $J_{FACTOR}'(i)$ be simplified using an algorithm, such as the following:

(1) Determine the maximum range of the desired latency characteristics:

MAX_RANGE=MAX$\{T_{MAX}(i)-T_{MIN}(i)\}$ for all $i$ (2) Determine a resolution factor R, required to provide adequate resolution of the priority level with the largest maximum range. For a preferred embodiment, a resolution factor R value of 10 is arbitrarily chosen. When implemented using integer arithmetic, this results in a scaled latency value with a range of at least 0 to 10.

R=10

(3) Determine a scaling factor based on the maximum range and resolution factor:

$S_{MAX}=R\times$MAX_RANGE (4) Scale $J_{FACTOR}'(i)$ by $S_{MAX}$:

$J_{FACTOR}(i)=J'_{FACTOR}(i)\times S_{MAX}$

Without loss of generality, we can assume that SMAX is 1 for the remainder of this description. After the $J_{FACTOR}$ for a queue is determined, that queue has been assigned a latency characteristic. Multiplying the shifted latency value of the oldest eligible packet in each queue by its corresponding $J_{FACTOR}$ yields a scaled latency value for the oldest packet in each queue. The multiplication operation of (($L_{MAX0}(i)-T_{MIN0}(i))*(J_{FACTOR}(i))$) can be shown to be the same as the division operation of (($L_{MAX0}(i)-T_{MIN0}(i))/(T_{MAX}(i)-T_{MIN}(i))$), and this division operation is an example of a "first function of the packet's latency and the at least one desired latency characteristic assigned to the relative scheduling priority for said packet." In particular, it can be noted that this first function is comprised of a ratio of the second function of said packet's latency to the third function of the at least one desired latency characteristic.

The value of this first function is stored in a register or memory location or on disk in step 58-2 for subsequent use, described below. As a result of the latency scaling of phase 58, each of the latencies of the oldest packet in each queue is normalized such that a comparison of the different scaled latencies identifies which of the oldest scaled latencies should be next routed to its destination based not only upon its time in queue but also its priority or service level.

The last phase of the scheduling algorithm (phase 60) is the selection function that actually picks an eligible packet to be transmitted to the output port. Assuming that strict priority scheduling is not necessary (due to the comparisons in phase 59), phase 60 sorts the scaled latencies determined at step 58-2 to find the maximum-scaled latency for the set of queues associated with an output port. In the first execution of the loop 60-4, "i" equals 0 and the comparison step 60-5 will store the scaled latency associated with the first evaluated queue to $SL_{MAX}$ in step 60-6. At step 60-7, the value of the loop counter "i" is tested to see if the last queue has been reached. If there are more queues to evaluate, the loop counter is incremented at step 60-8 so as to point to the next queue. As the loop counter "i" is incremented with each pass through the loop 60-4, the scaled latency of every queue is iteratively compared to the maximum scaled latency of all previously tested queues. In the event that a new maximum-scaled latency is determined, this value is stored at $SL_{MAX}$ in step 60-6. When the scaled latency value associated with the last queue has been evaluated, as determined by steps 60-7 and 60-8, the value stored at $SL_{MAX}$ will be the maximum-scaled latency value for the set of all queues for a particular port. The data packet associated with the maximum scaled latency value is then scheduled for delivery to the output port. If the queues depicted in FIG. 5 are for a port 0, for example, a packet associated with the maximum scaled latency as determined in phase 60 will be output to port 0.

If strict priority scheduling is required in phase 60 due to the comparisons in phase 59 (Strict(i)=1), then apparently one or more of the queues associated with this output port are latency violating queues. (Recall that a latency violating queue is defined to be a queue whose oldest packet has been waiting for a period of time longer than the maximum desired latency associated with the queue). The particular one packet that will be selected in this case will be the oldest packet associated with the latency violating queue whose relative priority is higher than all of the other latency violating queues. This strict priority scheduling method may be required at times. In particular, there may be transient intervals during which abnormally large amounts of data arrive to be switched through the data system 10. This large amount of data may be due to a single burst source or may be due to multiple flows creating a large amount of aggregated traffic. In either case, the maximum target packet latency for a queue, $T_{MAX0}$ to $T_{MAXN}$, may be exceeded, and congestion will be experienced that increases the number of packets in one or more queues. To compensate for the resulting heavy congestion that may occur when $T_{MAX}$ is exceeded in one or more queues, the strict priority scheduling algorithm can take over when it senses such a data overload condition (considered to be one form of a "data congestion threshold"). During these times of heavy congestion, the selection function switches from a latency sensitive scheduling method to a more congestion-responsive scheduling method. For instance, if the latency for a packet in queue 0 exceeds its $T_{MAX0}$, the more congestion-responsive method can schedule the packet without reference to other queues. This is known as "strict" scheduling, whereby any packets in violation of said restrictions are deemed of higher importance than any packets not in violation of said restrictions. In the instance of multiple scheduling violations, the modified algorithm schedules the highest priority queue from the set of all queues in violation. This is known as "priority" scheduling. Combining "strict scheduling" and "priority scheduling" characteristics, yield a scheduling method called "strict priority" scheduling. In essence, having a latency scheduler switch to a more aggressive scheduling methodology provides a method for handling data congestion overload conditions that a latency scheduler might not be able to accommodate. Accordingly, a latency scheduling method in combination with either a strict scheduling method and/or a priority scheduling method will attempt to unconditionally satisfy higher service levels that exceed their $T_{MAX}$ target first.

Slightly different latency-sensitive scheduling methods are implemented in alternate embodiments.

In one alternate embodiment, $T_{MAX0}$ and $T_{MIN0}$ are assigned to each packet as a packet latency characteristic instead of being assigned to a relative priority level to which many packets can point. A latency $J_{FACTOR}$ is calculated for each packet using one of the aforementioned equations for $J_{FACTOR}$. Using the aforementioned processes, a scaled latency is calculated for each packet by multiplying each packet's latency by the packet's $J_{FACTOR}$ to yield a scaled packet latency. For each packet in a queue, the greatest scaled packet latency is identified using any appropriate sorting or selection algorithm. After the greatest scaled packet latency for each queue is identified, the greatest scaled latency packet of all queues is next routed to its destination. As in the preferred embodiment, the greatest scaled packet latency of all packets in all queues is the packet next sent to its destination. Unlike the preferred embodiment, each queue will have a set of latency characteristics on a per packet basis. This enables greater flexibility in defining a priority's latency characteristics at the cost of increased complexity.

In a second alternate embodiment, the strict priority scheduling described in phase 60 can be eliminated, yielding a scheduling algorithm that is solely based on the latency-sensitive scheduling algorithm (even during times of heavy congestion).

For purposes of claim construction, the term "CMTS" and "data system" should also be considered to include any kind of computer, router, or switching system that schedules, provides, or otherwise attempts to provide different levels of service to data flows. The term "data packet" should be construed to include Ethernet and Ethernet-like data packets (also known as "frames"), token ring packets, ATM (asynchronous transfer mode) packets, SONET (synchronous optical network) packets or any other type of packet to which different service levels can be provided.

In a preferred embodiment, the priority queues are implemented using relatively high-speed (short access time) addressable semiconductor memory, e.g., SRAM, DRAM, well known to those of ordinary skill in the computer art. Implementations of the data system that don't require or demand high-speed data handling could use slower memory such as a disk storage device.

The time stamp circuit 22 can be implemented using field programmable gate arrays (FPGA), application specific integrated circuits (ASIC), combinational and sequential logic devices or suitably capable microprocessors. Different implementations of the time stamp circuit 22, function as a processor and each implementation is therefore considered to be a processor. The function of the time stamp circuit 22 is to determine a current time and append a current time stamp to data packets.

The port steering element 20 can also be implemented using field programmable gate arrays (FPGA), application specific integrated circuits (ASIC), combinational and sequential logic devices or suitably capable microprocessors. Different implementations of the port steering element 20 also function as a processor and each implementation is therefore considered to be a processor. The function of the port steering element 20 is to direct or route data packets to one or more appropriate data queues in the queue structure 25.

Similarly, scheduling engines 32 can also be implemented using field programmable gate arrays (FPGA), application specific integrated circuits (ASIC), combinational and sequential logic devices or suitably capable microprocessors. Different implementations of the scheduling engines 32 function as a processor and each implementation is therefore considered to be a processor. The function of the scheduling engines is to schedule the delivery of data packets from a particular queue to its output port using the foregoing methodology.

Packet latency values are derived from the current value of a global clock and from timestamp information. The $L_{MAX0}$ to $L_{MAXN}$ parameters are the maximum latency value in each queue. The $J_{FACTOR}$ parameters are calculated using $T_{MAX0}$ to $T_{MAXN}$ values, $T_{MIN0}$ to $T_{MINN}$ values and scaling constants that are all assigned by a system operator. All of the data values are preferably stored in relatively high-speed memory, or in registers, both of which are accessible to the scheduling engines. The aforementioned dedicated logic circuit(s), FPGA, ASIC or processor performs a least one calculation including but not limited to: packet sorting, packet latency, packet eligibility, packet overload and packet scaling.

While the preferred embodiment contemplates usage in the CMTS of a cable data system, those of skill in the art of queuing theory will recognize that the methodology disclosed herein is applicable to any system that uses or relies on queuing theory to determine the allocation of a resource as dictated by time constraints.

In a cable data system, having a CMTS using the methodology disclosed herein as well as a distribution network, such as a coaxial cable or fiber optic network a cable system operator can provide truly differentiated service levels and render to subscribers, truly different levels of service.

Queuing theory is often employed in other services, e.g., call service centers, which attempt to timely provide some form of limited-availability service to customers. In addition to using the above-identified method on only cable data systems, the method finds application to any service provider that wishes to provide differentiated levels of service. Accordingly, for purposes of claim construction the applicability of the disclosed and claimed methods are not limited to or by the term "data system" but to also include any sort of service provider that attempts to provide differentiated levels of service.

In a CMTS, the shared resource bandwidth capacity on an Ethernet or coaxial data link. In other non-data systems, the shared resource to be allocated would be the service that the provider nominally provides. In a fiber optic data system, the shared resource would be the availability of the cable to carry information.

What is claimed is:

1. In a data system that receives data packets and routes said data packets to one or more destinations, each data packet to be routed to its destination according to a relative scheduling priority, a method of scheduling the delivery of packets to a destination, comprising:

assigning at least one desired latency characteristic to each relative scheduling priority;

determining a maximum latency value for the packets in each one of a plurality of queues, each queue being associated with a relative scheduling priority;

determining a scaled latency value for each of the plurality of queues based on a function of the at least one desired latency characteristic and a function of the maximum latency value corresponding to each of the plurality of queues; and selecting for transmission a packet from among the plurality of queues based on a comparison of the scaled latency values for each of the plurality of queues.

2. The method of claim 1 wherein one of the at least one desired latency characteristics is a desired maximum amount of time a data packet should stay in a given queue.

3. The method of claim 1 wherein one of the at least one desired latency characteristics is a desired minimum amount of time a data packet should stay in a given queue.

4. The method of claim 3 wherein another desired latency characteristic is a desired maximum amount of time a packet should stay in the given queue.

5. The method of claim 4 wherein the function of the at least one desired latency characteristic is the inverse of the difference between the desired maximum and the desired minimum amounts of time a packet should remain in a queue.

6. The method of claim 5 wherein the function of the at least one desired latency characteristic is multiplied by a shifted latency value for the oldest packet in a queue to generate the scaled latency value for the oldest packet in the queue.

7. The method of claim 6 wherein the respective scaled latency values of the oldest packet in each of a plurality of queues are compared to one another such that the packet having the highest scaled latency value is scheduled for transmission next.

* * * * *